(12) United States Patent
Tsubaki

(10) Patent No.: US 6,923,061 B2
(45) Date of Patent: Aug. 2, 2005

(54) PHYSICAL QUANTITY SENSOR HAVING BEAM

(75) Inventor: Koichi Tsubaki, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/797,079

(22) Filed: Mar. 11, 2004

(65) Prior Publication Data

US 2004/0182158 A1 Sep. 23, 2004

(30) Foreign Application Priority Data

Mar. 20, 2003 (JP) .................................. 2003-077746

(51) Int. Cl.[7] .................... G01P 15/125; H01G 7/00
(52) U.S. Cl. .................... 73/514.32; 361/280
(58) Field of Search .................... 73/504.04, 504.16, 73/514.32, 514.15, 504.15; 361/280

(56) References Cited

U.S. PATENT DOCUMENTS 6,744,173 B2 * 6/2004 Behin et al. ................. 310/309
2002/0023492 A1   2/2002 Sakai et al.

FOREIGN PATENT DOCUMENTS

JP        A-H10-206457        8/1998

* cited by examiner

Primary Examiner—Hezron Williams
Assistant Examiner—Tamiko Bellamy
(74) Attorney, Agent, or Firm—Posz Law Group, PLC

(57) ABSTRACT

A physical quantity sensor for detecting physical quantity includes a substrate having an opening; a beam protruding in the opening of the substrate and supported on the substrate; and a fixed electrode supported on the substrate. The beam is movable in a vertical direction of the substrate so that the physical quantity in the vertical direction is detectable. The sensor can be minimized, and has excellent output characteristics. Further, a manufacturing cost of the sensor is small.

15 Claims, 4 Drawing Sheets

PHYSICAL QUANTITY SENSOR HAVING BEAM

CROSS REFERENCE TO RELATED APPLICATION

This application is based on Japanese Patent Application No. 2003-77746 filed on Mar. 20, 2003, the disclosure of which is incorporated herein by reference.

FIELD OF THE INVENTION

The present invention relates to a physical quantity sensor having a beam.

BACKGROUND OF THE INVENTION

A physical quantity sensor detects a physical quantity by measuring a capacitance change of a capacitor between a fixed electrode supported on a substrate and a movable electrode disposed on a beam, which is displaced by a physical quantity.

The physical quantity sensor is, for example, used for a vehicle. The sensor, for example, works as an acceleration sensor for controlling kinetic control equipment such as a vehicle stability control system. This acceleration sensor is required to have high reliability and to be minimized. Therefore, the sensor is manufactured by using a micro machine process, to which a conventional semiconductor manufacturing process is applied. The acceleration sensor is disclosed, for example, in Japanese Unexamined Patent Application Publication No. 2002-71707 (i.e., U.S. Pat. No. 2002-0,023,492). The sensor is a capacitance type acceleration sensor, which includes a support substrate, a beam, a movable electrode and a fixed electrode.

The support substrate is made of silicon substrate. The beam is made of silicon, and supported on the substrate through an anchor and an insulation film. The movable electrode has a comb teeth structure, and is formed integrally with the beam. The fixed electrode is made of silicon, has a comb teeth structure, and is supported on the substrate through the insulation film.

The support substrate has a principal plane having a plate shape. When the acceleration including a certain component is applied to the sensor, the movable electrode is displaced in accordance with the acceleration. Therefore, a distance between the movable electrode and the fixed electrode is changed, so that the capacitance of a capacitor between the fixed and movable electrodes is also changed. Then, the sensor detects the capacitance change and outputs a sensor signal corresponding to the acceleration. Here, the certain component of the acceleration is parallel to the principal plane of the substrate and perpendicular to a protrusion direction of the movable and fixed electrodes.

When the sensor is mounted in the vehicle, and an electronic substrate for accommodating the sensor is horizontalized in the vehicle, the sensor is mounted parallel to the electronic substrate so that the acceleration parallel to the horizontal direction (i.e., the direction parallel to the ground) can be detected. However, when the sensor detects the acceleration perpendicular to the horizontal direction (i.e., the direction perpendicular to the ground), the sensor is required to be mounted perpendicularly to the electronic substrate. Therefore, an additional handling jig is necessitated to mount the sensor on the electronic substrate in such a manner that the sensor is perpendicular to the electronic substrate. This cause a manufacturing cost of the sensor higher. Further, two acceleration sensors are mounted on the substrate so as to detect the accelerations in two directions, one of which is perpendicular to the other. In this case, it is necessary to mount two sensors having a plate shape in a package and to orthogonalize the sensors each other. Therefore, arrangement efficiency of the package is decreased so that the package becomes larger. Thus, minimization of the package cannot be achieved.

Further, when the sensor is minimized, the distance between the fixed and movable electrodes is also reduced. Therefore, the movable electrode is affected by a coulomb force generated between the fixed and movable electrodes. The coulomb force is in proportion to the distance squared. Therefore, a relationship between the acceleration applied to the sensor and the sensor output shows a non-linear characteristic. That is, the relationship does not show a proportionality relation. Therefore, an available range of the sensor output is limited.

SUMMARY OF THE INVENTION

In view of the above-mentioned problems, it is an object of the present invention to provide a physical quantity sensor for detecting a physical quantity. Specifically, the sensor can detect the physical quantity in a vertical direction of a substrate. Further, the sensor can be minimized, and has excellent output characteristics. Furthermore, a manufacturing cost of the sensor is small.

A physical quantity sensor for detecting physical quantity includes a substrate having an opening; a beam protruding in the opening of the substrate and supported on the substrate; and a fixed electrode supported on the substrate. The beam is movable in a vertical direction of the substrate so that the physical quantity in the vertical direction is detectable. The sensor can detect the physical quantity in a vertical direction of a substrate. Further, the sensor can be minimized, and has excellent output characteristics. Furthermore, a manufacturing cost of the sensor is small.

Preferably, the fixed electrode includes a first fixed electrode and a second fixed electrode. The first and second fixed electrodes protrude in the opening of the substrate. The beam includes a movable electrode. The movable electrode faces both of the first and second fixed electrodes to provide first and second capacitors, respectively. More preferably, the second fixed electrode is disposed over the first fixed electrode at a predetermined distance so that the second fixed electrode is electrically insulated from the first fixed electrode. The second fixed electrode has a top surface, which is disposed on a same plane as a top surface of the movable electrode. The first fixed electrode has a bottom surface, which is disposed on a same plane as a bottom surface of the movable electrode. Furthermore preferably, the first capacitor has a first capacitance provided by a first facing area between the first fixed electrode and the movable electrode. The second capacitor has a second capacitance provided by a second facing area between the second fixed electrode and the movable electrode. The movable electrode is movable upwardly so that the first facing area is reduced in a case where the physical quantity is applied to the substrate toward a upper direction of the substrate. The movable electrode is movable downwardly so that the second facing surface is reduced in a case where the physical quantity is applied to the substrate toward a lower direction of the substrate. Furthermore preferably, the physical quantity applied to the substrate has a magnitude and an operation direction, both of which are detectable by measuring the first and second capacitances. The substrate is made of semiconductor. The beam and the fixed electrode are made of doped semiconductor.

Preferably, the movable electrode has a rod shape so that the movable electrode includes both sides and the bottom and top surfaces. Both of the first and second fixed electrodes have a rod shape so that the first and second fixed electrodes include both sides and bottom and top surfaces, respectively. One side of the movable electrode faces one side of the first fixed electrode, and the one side of the movable electrode faces one side of the second fixed electrode. More preferably, both sides of the movable electrode and both sides of both of the first and second fixed electrodes are parallel to the vertical direction of the substrate.

Preferably, the beam is supported at both ends of the beam on the substrate. The first and second fixed electrodes are cantilevered from the substrate. More preferably, the beam includes a pair of spring portion, a massive portion and a plurality of movable electrodes. One of the spring portions of the beam is disposed on one end of the beam so that the spring portion connects to the substrate to support the beam, and the other spring portion is disposed on the other end of the beam so that the spring portion connects to the substrate to support the beam. The massive portion is disposed between the spring portions. The movable electrodes protrude from the massive portion toward a perpendicular direction of the massive portion. Furthermore preferably, the fixed electrode includes a first fixed electrode and a second fixed electrode. The opening of the substrate has a rectangular shape so that the substrate includes a pair of latitudinal sides and a pair of longitudinal sides. The first fixed electrode protrudes from both of the latitudinal sides of the substrate, and the second fixed electrode protrudes from both of the latitudinal sides of the substrate. The beam, the fixed electrode and the substrate have plane symmetry.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
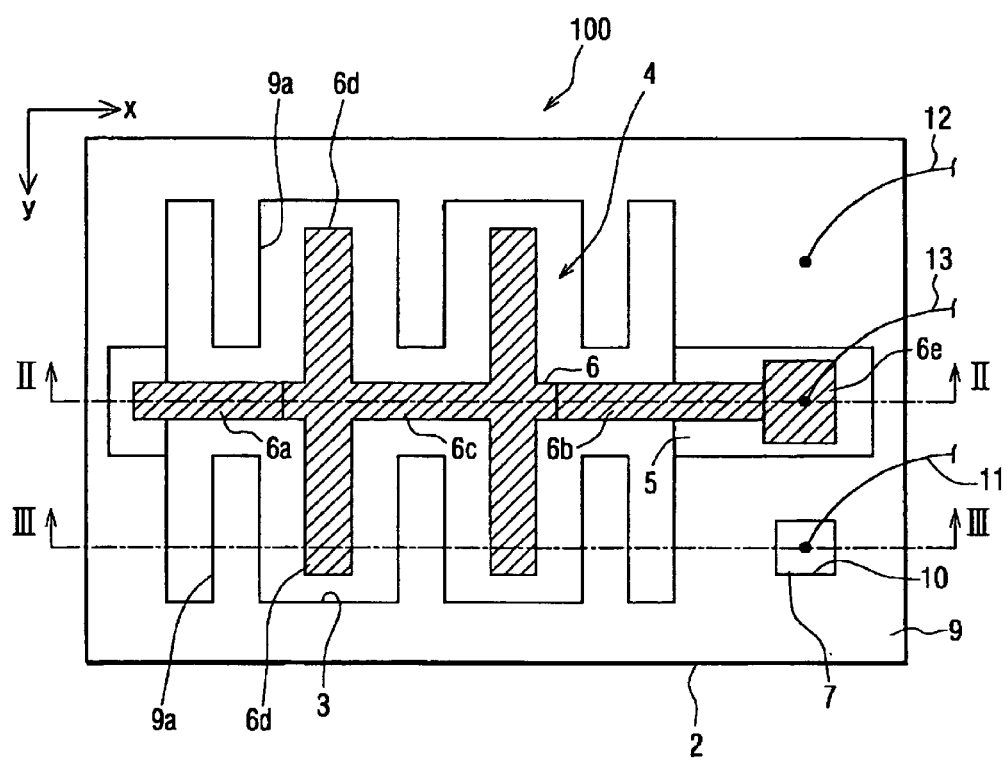
FIG. 1 is a plan view showing an acceleration sensor according to a preferred embodiment of the present invention.
Figure 2:
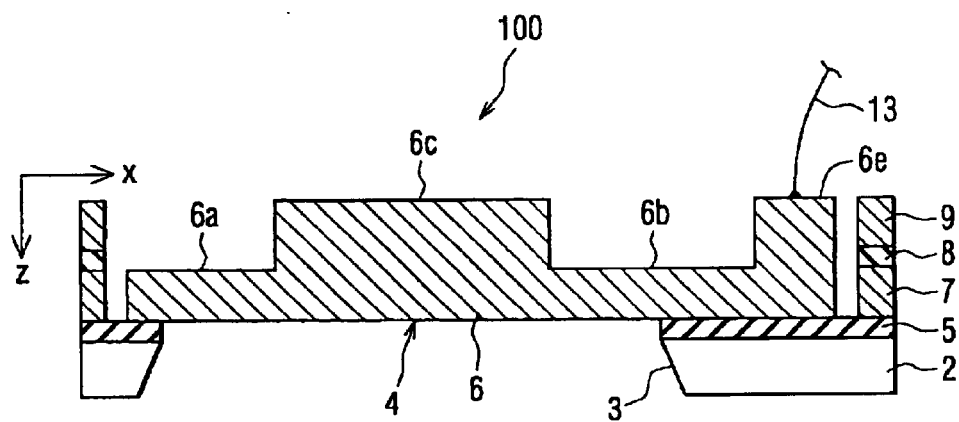
FIG. 2 is a cross sectional view showing the sensor taken along line II—II in FIG. 1.
Figure 3:
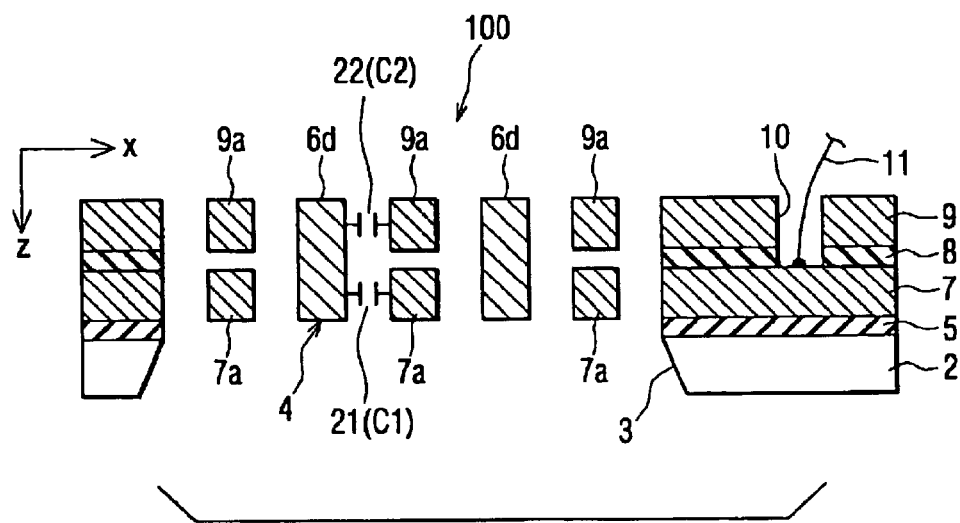
FIG. 3 is a cross sectional view showing the sensor taken along line III—III in FIG. 1.

A physical quantity sensor 100 according to a preferred embodiment of the present invention is shown in FIGS. 1–3. The sensor 100 is, for example, a semiconductor acceleration sensor for detecting an acceleration applied to the sensor 100. In FIG. 1, a horizontal direction of FIG. 1 (i.e., a right-left direction) is referred to as an X direction, a perpendicular direction of FIG. 1 (i.e., a upper-lower direction) is referred to as a Y direction, and a vertical direction of FIG. 1 (i.e., a direction perpendicular to the drawing of FIG. 1) is referred to as a Z direction. Therefore, the X and Y direction is parallel to a support substrate 2, and the Z direction is perpendicular to the support substrate 2.

The support substrate 2 has a rectangular shape, and is made of, for example, silicon substrate. An opening 3 is formed on a principal plane of the support substrate 2. The opening 3 passes through the substrate 2 in the Z direction. A beam 4 is supported on the substrate 2 at both ends of the beam 4. The beam 4 faces the opening 3. The beam 4 is made of poly crystalline silicon film. An impurity is doped and diffused in the poly crystalline silicon film so that the poly crystalline silicon film has a P type or an N type conductivity. The first insulation film 5 is formed on the principal plane of the substrate 2. The beam 4 is supported on the substrate 2 at both ends of the beam 4 through the first insulation film 5.

The beam 4 includes a beam body 6 having a pair of spring portions 6a, 6b and a massive portion 6c. The spring portions 6a, 6b are disposed both ends of the beam body 6. The film thickness of each spring portion 6a, 6b is comparatively thin. The massive portion 6c is disposed on the center of the beam body 6. The film thickness of the massive portion 6c is comparatively thick. When the acceleration is applied to the sensor in the Z direction, the massive portion 6c is displaced in the Z direction. Specifically, the Z direction is an objective detection direction, and the massive portion 6c moves toward an operation direction of the acceleration. Multiple movable electrodes 6d are formed on both sides of the massive portion 6c. In FIG. 1, two pairs of the movable electrodes are formed. Each movable electrode 6d disposed on the same side of the massive portion 6c has a predetermined distance between them. The movable electrode 6d is perpendicular to the beam body 6, and protrudes from the beam body 6 in the Y direction, which is parallel to the principal plane of the substrate 2. The movable electrode 6d is formed integrally with the beam body 6. A terminal portion 6e is disposed at one end of the beam body 6, i.e., at the end of the spring portion 6b. The film thickness of the terminal portion 6e is comparatively thick, and the terminal portion 6e is formed integrally with the beam body 6. The movable electrode 6d has a rectangular cross section, so that the movable electrode 6d has a rod shape. A side of the movable electrode 6d works as an electrode surface. The side of the movable electrode 6d is parallel to the Z direction, which is a displacement direction of the beam 4 and faces the first or second fixed electrodes 7a, 9a.

The first fixed electrode support 7 is formed on the first insulation film 5 of the substrate 2. The first fixed electrode 7a is cantilevered (i.e., supported at one end thereof) to the first fixed electrode support 7. In this embodiment, the first fixed electrode 7a includes, for example, three first rods, as shown in FIG. 3. Each first rod protrudes from the first fixed electrode support 7 to the opening 3. The first fixed electrode 7a is made of poly crystalline silicon film having a P type or an N conductivity, which is prepared by doping and diffusing an impurity in the poly crystalline silicon film. The first fixed electrode 7a has a rectangular cross section, so that the first fixed electrode 7a has a rod shape. A side of the first fixed electrode 7a works as an electrode surface so that the side of the first fixed electrode 7a faces the side of the movable electrode 6d at a predetermined distance. Specifically, the side of the first fixed electrode 7a is parallel to the side of the movable electrode 6d. Therefore, the first capacitor 21 having the first capacitance C1 is formed between the side of the first fixed electrode 7a and the side of the movable electrode 6d. Thus, multiple first capacitors 21 are formed therebetween.

The second fixed electrode support 9 is formed on the first fixed electrode support 7 through the second insulation film 8 so that the second fixed electrode support 7 is insulated and isolated from the first fixed electrode support 5. The second insulation film 8 is formed by a deposition method and the like.

The second fixed electrode 9a is cantilevered to the second fixed electrode support 9. In this embodiment, the second fixed electrode 9a includes the three second rods, as shown in FIG. 3. Each second rod protrudes from the second fixed electrode support 9 to the opening 3. The second rods are arranged in the same manner as the first rods of the first fixed electrode 7a, so that the second rods are disposed on the first rods, respectively. The second fixed electrode 9a is made of poly crystalline silicon film having a P type or an N conductivity, which is prepared by doping and diffusing an impurity in the poly crystalline silicon film. The second fixed electrode 9a has a rectangular cross section, so that the second fixed electrode 9a has a rod shape. A side of the second fixed electrode 9a works as an electrode surface so that the side of the second fixed electrode 9a faces the side of the movable electrode 6d at a predetermined distance. Specifically, the side of the second fixed electrode 9a is parallel to the side of the movable electrode 6d. Therefore, the second capacitor 22 having the second capacitance C2 is formed between the side of the second fixed electrode 9a and the side of the movable electrode 6d. Thus, multiple second capacitors 22 are formed therebetween.

A contact hole 10 is formed in the second fixed electrode support 9 and the second insulation film 8. The contact hole 10 penetrates through the second fixed electrode support 9 and the second insulation film 8, and reaches the first fixed electrode support 7. A part of the first fixed electrode support 7 corresponding to the contact hole 10 is a highly doped portion, in which the impurity is highly doped so as to connect to the first bonding wire 11 with an ohmic contact. The first bonding wire 11 for the first fixed electrode 7a is bonded to the highly doped portion of the first fixed electrode support 7. Further, a predetermined part of the second fixed electrode support 9 is a highly doped portion, in which the impurity is highly doped so as to connect to the second bonding wire 12 with an ohmic contact. The second bonding wire 12 for the second fixed electrode 9a is bonded to the highly doped portion of the second fixed electrode support 9. Furthermore, the terminal portion 6e is a highly doped portion, in which the impurity is highly doped so as to connect to the third bonding wire 13 with an ohmic contact. The third bonding wire 13 for the movable electrode 6d is bonded to the highly doped portion of the terminal portion 6e.

The sensor 100 is manufactured as follows. FIGS. 4A to 5C show a manufacturing process of the sensor 100. Here, FIGS. 4A to 5C are schematic cross sectional views so that the numbers of the movable and fixed electrodes 6d, 7a, 9a do not coincide with that of the sensor 100 shown in FIGS. 1–3.

Figure 4A:
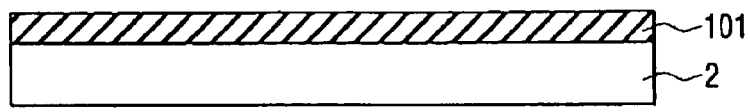
FIGS. 4A to 4E are cross sectional views explaining a manufacturing process of the sensor according to the preferred embodiment.

As shown in FIG. 4A, a silicon oxide film 101 for providing the first insulation film 5 is formed on the support substrate 2 by a thermal oxidation method or a CVD (i.e., chemical vapor deposition) method. The silicon oxide film 101 also works as a sacrifice layer and an etching stopper.

Figure 4B:
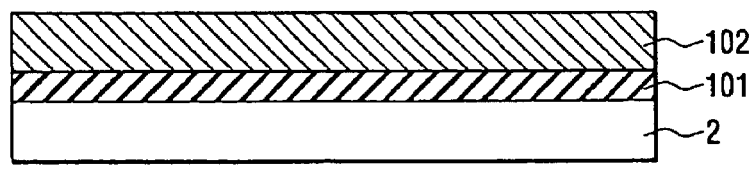

As shown in FIG. 4B, a poly crystalline silicon film 102 is formed on the silicon oxide film 101 by the CVD method and the like. Then, the impurity is heavily doped in the poly crystalline silicon film 102 by using the diffusion method and the like. The poly crystalline silicon film 102 provides a part of the beam 4, i.e., the spring portions 6a, 6b, a lower half portion of the massive portion 6c, a lower half portion of the movable electrode 6d and a lower half portion of the terminal portion 6e. Further, the poly crystalline silicon film 102 provides the first fixed electrode support 7.

Figure 4C:
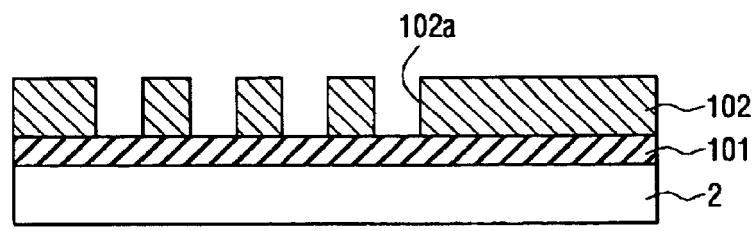

As shown in FIG. 4C, the poly crystalline silicon film 102 is patterned into a predetermined pattern by a photolithography method and the like so that multiple openings 102a are formed in the poly crystalline silicon film 102. Thus, regions for providing the part of the beam 4 (i.e., the spring portions 6a, 6b, the lower half portion of the massive portion 6c, the lower half portion of the movable electrode 6d and the lower half portion of the terminal portion 6e) and the first fixed electrode support 7 are formed.

Figure 4D:
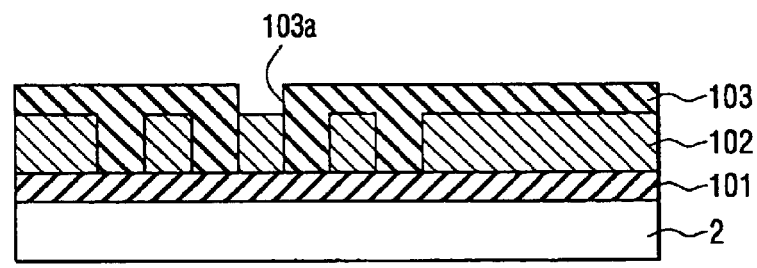

As shown in FIG. 4D, a silicon oxide film 103 for providing the second insulation film 8 is formed on the poly crystalline silicon film 102 including the openings 102a by the CVD method and the like. Then, another opening 103a is formed in the silicon oxide film 103. The opening 103a reaches the poly crystalline silicon film 102 so as to provide the massive portion 6c and the movable electrode 6d. The silicon oxide film 103 also works as a sacrifice layer. After the silicon oxide film 103 is deposited, if necessary, the surface of the silicon oxide film 103 is flattened.

Figure 4E:
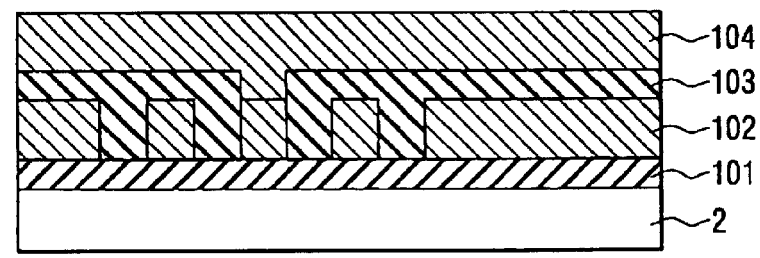

As shown in FIG. 4E, a poly crystalline silicon film 104 is formed on the silicon oxide film 103 including the opening 103a by the CVD method and the like. Then, the impurity is heavily doped in the poly crystalline silicon film 104 by using the diffusion method and the like. The poly crystalline silicon film 104 provides another part of the beam 4, i.e., an upper half portion of the massive portion 6c, an upper half portion of the movable electrode 6d and an upper half portion of the terminal portion 6e, and the second fixed electrode support 9. After the poly crystalline silicon film 104 is deposited, if necessary, the surface of the poly crystalline silicon film 104 is flattened.

Figure 5A:
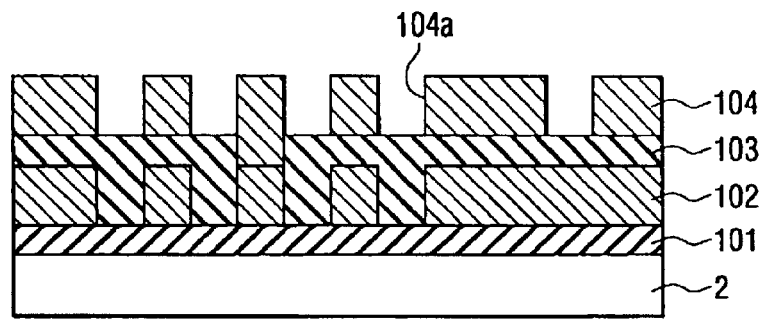
FIGS. 5A to 5C are cross sectional views explaining the manufacturing process of the preferred embodiment.

As shown in FIG. 5A, the poly crystalline silicon film 104 is patterned into a predetermined pattern by a photolithography method and the like so that multiple openings 104a are formed in the poly crystalline silicon film 104. Thus, regions for providing the other part of the beam 4, (i.e., the upper half portion of the massive portion 6c, the upper half portion of the movable electrode 6d and the upper half portion of the terminal portion 6e) and the second fixed electrode support 9 are formed. Further, the opening 104a provides the contact hole 10.

Figure 5B:
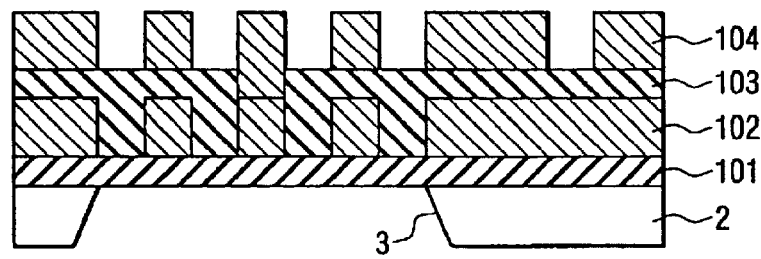

As shown in FIG. 5B, the substrate 2 is etched with a KOH (i.e., potassium hydroxide) solution so that the substrate 2 is anisotropically etched. Thus, the opening 3 is formed in the substrate 2. In this case, the silicon oxide film 101 works as the etching stopper.

Figure 5C:
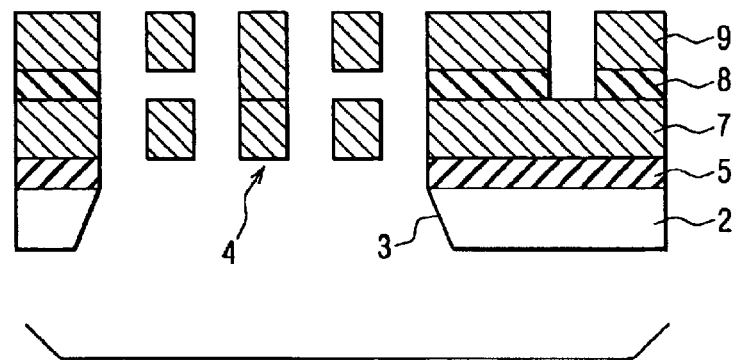

As shown in FIG. 5C, the silicon oxide films 101, 103 as the sacrifice layers are isotorpically etched with a hydrofluoric acid series etchant so that the beam 4 is released from the substrate 2.

In the sensor 100, the capacitors 21 formed between the movable electrode 6d and the first fixed electrode 7a are connected together in parallel, and the capacitors 22 formed between the movable electrode 6d and the second fixed electrode 9a are connected together in parallel. Each capacitance C1, C2 of the capacitors 21, 22 can be detected by various detection circuits. In general, when the capacitance C1, C2 is detected, an AC (i.e., alternating current) voltage having a predetermined frequency is applied to the capacitors 21, 22. When the AC voltage is applied to the capacitors 21, 22, a coulomb force is generated between the movable electrode 6d and the first fixed electrode 7a and/or between the movable electrode 6d and the second fixed electrode 9a. Therefore, the movable electrode 6d is balanced and held at a certain position shown in FIG. 3.

When the movable electrode 6d is balanced, and the acceleration in the Z direction is applied to the sensor 100, the beam 4 is displaced in the operation direction of the acceleration. Therefore, the movable electrode 6d is also displaced in accordance with the beam 4. At that time, the movable electrode 6d is displaced along with a direction parallel to the side surface of the movable electrode 6d. Thus, one of facing areas between the first fixed electrode 7a and the movable electrode 6d and between the second fixed electrode 9a and the movable electrode 6d is changed. Therefore, one of the capacitances C1, C2 is also changed in accordance with the change of the one facing area.

When the acceleration having a direction of an arrow Z in FIG. 3 (i.e., the downward acceleration in FIG. 3) is applied to the sensor 100, the facing area between the movable electrode 6d and the first fixed electrode 7a is not changed. Therefore, the capacitance C1 does not change because the facing area is not changed. However, the facing area between the movable electrode 6d and the second fixed electrode 9a is changed, i.e., reduced. Therefore, the capacitance C2 is reduced in proportion to a reduction of the facing area.

When the acceleration having an opposite direction of the arrow Z in FIG. 3 (i.e., the upward acceleration in FIG. 3) is applied to the sensor 100, the facing area between the movable electrode 6d and the second fixed electrode 9a is not changed. Therefore, the capacitance C2 does not change because the facing area is not changed. However, the facing area between the movable electrode 6d and the first fixed electrode 7a is changed, i.e., reduced. Therefore, the capacitance C1 is reduced in proportion to a reduction of the facing area.

Thus, one of the capacitances C1, C2 of the capacitors 21, 22 is changed in accordance with a magnitude of the acceleration and the operation direction of the acceleration. Therefore, the magnitude and the operation direction of the acceleration are detected on the basis of a difference between the capacitance changes of the capacitors 21, 22.

When the sensor 100 is mounted, for example, on a vehicle, the substrate 2 is mounted parallel to a horizontal direction (i.e., the substrate is mounted parallel to the ground) so that the sensor 100 can detect the acceleration perpendicular to the horizontal direction (i.e., perpendicular to the ground). Therefore, no additional handling jig is necessitated to mount the sensor 100 perpendicularly to the ground. Therefore, a manufacturing cost of the sensor 100 is reduced.

Further, when the sensor 100 according to the preferred embodiment of the present invention and a conventional sensor for detecting an acceleration in the horizontal direction are combined such that the sensor 100 is stacked on the conventional sensor, the combination of the sensor 100 and the conventional sensor can detect the acceleration in two different directions, each of which is perpendicular to each other. It is not necessary to mount two sensors having a plate shape in a package and to orthogonalize the sensors each other. Therefore, arrangement efficiency of the package is increased so that the package becomes smaller. Thus, minimization of the package can be achieved.

Further, the distances between the movable electrode 6d and the first fixed electrode 7a and the distance between the movable electrode 6d and the second fixed electrode 9a are not changed (i.e., reduced) substantially. Therefore, the coulomb force does not deteriorate a relationship between the acceleration applied to the sensor and the sensor output, so that the relationship shows a linear characteristic. That is, the relationship shows a proportionality relation. Therefore, output characteristics are improved.

Further, the beam 4 is supported at both ends of the beam 4 to the substrate 2. Therefore, the movable electrode 6d moves smoothly and stably when the acceleration is applied to the sensor 100. Therefore, the reliability of the sensor 100 is improved, so that the sensor characteristics are much improved. Furthermore, the spring portions 6a, 6b of the beam 4 can be have a predetermined shape so that the characteristics of the spring portions 6a, 6b can be controlled. For example, the dimension in the Z direction (i.e., the film thickness) of the spring portions 6a, 6b can be changed in order to change the spring constant of the spring portions 6a, 6b. Here, the spring constant can be changed as long as the spring portion 6a, 6b has a sufficient strength, which is in a range of the maximum breaking strength (i.e., the maximum mechanical strength). Therefore, the sensor 100 can have a different sensitivity of the acceleration by changing the spring constant of the spring portion 6a, 6b.

Thus, the sensor 100 can detect the physical quantity in the vertical direction of the substrate 2. Further, the sensor 100 can be minimized, and has excellent output characteristics. Further, the manufacturing cost of the sensor 100 is small. Furthermore, the physical quantity sensor 100 combined with the conventional sensor can detect physical quantity having two direction components.

Although the sensor 100 has a pair of the capacitors 21, 22 between the movable electrode 6d and the first and second fixed electrodes 7a, 9a, the sensor 100 can have multiple pairs of the capacitors, for example, three or four pairs of the capacitors stacked in the Z direction.

Although the sensor 100 is used for the acceleration sensor, the sensor 100 can be used for another physical quantity sensor such as a yaw-rate sensor, an angular speed sensor and an impact sensor.

Such changes and modifications are to be understood as being within the scope of the present invention as defined by the appended claims.

What is claimed is:

1. A physical quantity sensor for detecting physical quantity, the sensor comprising:
   a substrate having an opening;
   a beam protruding in the opening of the substrate and supported on the substrate; and
   a fixed electrode supported on the substrate,
   wherein the beam is movable in a vertical direction of the substrate so that the physical quantity in the vertical direction is detectable,
   wherein the fixed electrode includes a first fixed electrode and a second fixed electrode, the first and second fixed electrodes protruding in the opening of the substrate,
   wherein the beam includes a moveable electrode, the moveable electrode facing both of the first and second fixed electrodes to provide first and second capacitors, respectively, and
   wherein the moveable electrode is parallel to the first and the second fixed electrodes in a predetermined direction so that the moveable electrode is moveable in the vertical direction perpendicular to the predetermined direction in accordance with the physical quantity applied to the sensor.

2. The sensor according to claim 1,
   wherein the second fixed electrode is disposed over the first fixed electrode at a predetermined distance so that the second fixed electrode is electrically insulated from the first fixed electrode,
   wherein the second fixed electrode has a top surface, which is disposed on a same plane as a top surface of the movable electrode,
   wherein the first fixed electrode has a bottom surface, which is disposed on a same plane as a bottom surface of the movable electrode.

3. The sensor according to claim 2,
   wherein the first capacitor has a first capacitance provided by a first facing area between the first fixed electrode and the movable electrode,
   wherein the second capacitor has a second capacitance provided by a second facing area between the second fixed electrode and the movable electrode,
   wherein the movable electrode is movable upwardly so that the first facing area is reduced in a case where the physical quantity is applied to the substrate toward a upper direction of the substrate, and wherein the movable electrode is movable downwardly so that the second facing surface is reduced in a case where the physical quantity is applied to the substrate toward a lower direction of the substrate.

4. The sensor according to claim 3,
wherein the physical quantity applied to the substrate has a magnitude and an operation direction, both of which are detectable by measuring the first and second capacitances, wherein the substrate is made of semiconductor, and wherein the beam and the fixed electrode are made of doped semiconductor.

5. The sensor according to claim 1,
wherein the movable electrode has a rod shape so that the movable electrode includes both sides and the bottom and top surfaces, wherein both of the first and second fixed electrodes have a rod shape so that the first and second fixed electrodes include both sides and bottom and top surfaces, respectively, and wherein one side of the movable electrode faces one side of the first fixed electrode, and the one side of the movable electrode faces one side of the second fixed electrode.

6. The sensor according to claim 5,
wherein both sides of the movable electrode and both sides of both of the first and second fixed electrodes are parallel to the vertical direction of the substrate.

7. The sensor according to claim 1,
wherein the beam is supported at both ends of the beam on the substrate, and wherein the first and second fixed electrodes are cantilevered from the substrate.

8. The sensor according to claim 7,
wherein the beam includes a pair of spring portions, a massive portion and a plurality of movable electrodes, wherein one of the spring portions of the beam is disposed on one end of the beam so that the one spring portion connects to the substrate to support the beam, and the other spring portion is disposed on the other end of the beam so that the other spring portion connects to the substrate to support the beam, wherein the massive portion is disposed between the spring portions, and wherein the movable electrodes protrude from the massive portion toward a perpendicular direction of the massive portion.

9. The sensor according to claim 8,
wherein the fixed electrode includes a first fixed electrode and a second fixed electrode, wherein the opening of the substrate has a rectangular shape so that the substrate includes a pair of latitudinal sides and a pair of longitudinal sides, wherein the first fixed electrode protrudes from both of the latitudinal sides of the substrate, and the second fixed electrode protrudes from both of the latitudinal sides of the substrate, and wherein the beam, the fixed electrode and the substrate have plane symmetry.

10. The sensor according to claim 9,
wherein the first fixed electrode faces the movable electrode so that a first capacitor having a first capacitance is provided, wherein the second fixed electrode faces the movable electrode so that a second capacitor having a second capacitance is provided, wherein the movable electrode and the first and second fixed electrodes have a comb-teeth shape, wherein the beam together with the movable electrodes is movable in a vertical direction of the substrate so that the physical quantity in the vertical direction is detectable, wherein the second fixed electrode is disposed over the first fixed electrode at a predetermined distance so that the second fixed electrode is electrically insulated from the first fixed electrode, wherein the second fixed electrode has a top surface, which is disposed on a same plane as a top surface of the movable electrode, and wherein the first fixed electrode has a bottom surface, which is disposed on a same plane as a bottom surface of the movable electrode.

11. The sensor according to claim 10,
wherein the movable electrode has a rod shape so that the movable electrode includes both sides and the bottom and top surfaces, wherein both of the first and second fixed electrodes have a rod shape so that the first and second fixed electrodes include both sides and bottom and top surfaces, respectively, wherein one side of the movable electrode faces one side of the first fixed electrode, and the one side of the movable electrode faces one side of the second fixed electrode, and wherein both sides of the movable electrode and both sides of both of the first and second fixed electrodes are parallel to the vertical direction of the substrate.

12. The sensor according to claim 11,
wherein the physical quantity applied to the substrate has a magnitude and an operation direction, both of which are detectable by measuring the first and second capacitances, wherein the substrate is made of semiconductor, and wherein the beam and the fixed electrode are made of doped semiconductor.

13. The sensor according to claim 1,
wherein the sensor is an acceleration sensor, a yaw-rate sensor, an angular speed sensor or an impact sensor.

14. The sensor according to claim 1,
wherein the first fixed electrode is disposed on the second fixed electrode in the vertical direction of the substrate, and wherein the moveable electrode includes one side facing both of the first and the second fixed electrodes.

15. The sensor according to claim 1,
wherein the first fixed electrode is parallel to the second fixed electrode in the vertical direction of the substrate, and wherein the moveable electrode is parallel to both the first and the second fixed electrodes in a horizontal direction of the substrate.

* * * * *